United States Patent [19]
Drexel et al.

[11] Patent Number: 5,297,770
[45] Date of Patent: Mar. 29, 1994

[54] SUPPORTING PLATE AND METHOD OF PRODUCING THE SAME

[75] Inventors: Peter Drexel, Steinenbronn; Werner Arleth, Esslingen/N; Horst-Dieter Lange, Baltmannsweiler, all of Fed. Rep. of Germany

[73] Assignee: Robert Bosch GmbH, Stuttgart, Fed. Rep. of Germany

[21] Appl. No.: 773,600
[22] PCT Filed: Apr. 25, 1991
[86] PCT No.: PCT/DE91/00346
 § 371 Date: Nov. 22, 1991
 § 102(e) Date: Nov. 22, 1991
[87] PCT Pub. No.: WO91/18238
 PCT Pub. Date: Nov. 28, 1991

[30] Foreign Application Priority Data
May 16, 1990 [DE] Fed. Rep. of Germany ....... 4015693

[51] Int. Cl.$^5$ ............................................... F16M 1/00
[52] U.S. Cl. ...................................... 248/679; 248/638
[58] Field of Search .............. 248/676, 678, 638, 680, 248/679; 52/600, 601

[56] References Cited

U.S. PATENT DOCUMENTS

| | | | |
|---|---|---|---|
| 2,398,239 | 4/1946 | Melin | 248/679 X |
| 3,361,399 | 1/1968 | Hestand | 248/679 |
| 3,469,809 | 9/1969 | Reznick | 248/678 X |
| 4,354,655 | 10/1982 | Hengst | 248/676 X |
| 4,670,208 | 6/1987 | Koblischek | 248/679 X |
| 4,682,754 | 7/1987 | Ebata | 52/601 X |
| 4,694,190 | 9/1987 | Lane | 248/679 X |
| 4,700,923 | 10/1987 | Lewis | 248/680 X |
| 4,826,127 | 5/1989 | Koblischek | 248/679 |
| 4,856,752 | 8/1989 | Linn | 248/678 |
| 5,149,050 | 9/1992 | Smith | 248/679 |

FOREIGN PATENT DOCUMENTS

| | | | |
|---|---|---|---|
| 2521036 | 11/1976 | Fed. Rep. of Germany | 248/679 |
| 1380351 | 10/1964 | France | 248/679 |

OTHER PUBLICATIONS

3 D-Messtechnik, Kontrolle 1990, Jan./Feb., pp. 10, 13, 14.
Prospekt der Firma Precimac eing, Apr. 18, 1990.
Prospekt der Firma Item GmbH "Der Gesamtkatalog MB-System" eing., Nov. 16, 1989, pp. 12-14, 21-24, 226-228.
"Mineralgusse für den Maschinenbau", Sonderdruck aus Ingenieur-Werkstoffe, vol. 1, 1989, No. 7/8.

*Primary Examiner*—J. Franklin Foss
*Attorney, Agent, or Firm*—Michael J. Striker

[57] ABSTRACT

A supporting plate for setting up fabrication, assembly and/or test equipment has a framework which is filled with a mineral casting so that the framework and the mineral casting form a solid plate. The framework can be placed on a mould underlay and used as a casting mould during filing of the mineral casting.

13 Claims, 2 Drawing Sheets

SUPPORTING PLATE AND METHOD OF PRODUCING THE SAME

BACKGROUND OF THE INVENTION

The invention relates to a supporting plate and a method of producing the same. Supporting plates are used for setting up fabrication, assembly and/or test equipment. Conventional supporting plates comprise steel plates, on which the outer contours and sizeable openings are produced by flame cutting. In order to obtain the necessary flatness and surface quality, the steel plate surfaces are machined on both sides. For fastening measures, threaded bores and through-holes are made individually, according to requirements. The steel plate rests directly on a trestle. It is being necessary for this steel plate to have a certain minimum thickness, depending on the application, for the purpose of stability. The supporting function is performed by the steel plate itself. For surface protection and for decorative reasons, a surface finish is necessary. The disadvantages of these supporting plates are that they are expensive to produce, that quick availability is ruled out due to the great amount of work involved, and that a great amount of material is necessary in order to obtain high vibration damping. Consequently, such supporting plates are very heavy.

SUMMARY OF THE INVENTION

Accordingly, it is an object of the present invention to provide a supporting plate and a method of producing the same which avoids the disadvantages of the prior art.

In particular, it is an object of the present invention to provide a supporting plate which can be produced inexpensively and is quickly available and has vibration damping eight to twelve times higher than a comparable steel plate. Furthermore, in conjunction with the method of producing the plate according to the invention, the supporting plate according to the invention has great freedom from distortion, it having been possible to demonstrate a flatness of <0.5 mm over a length of 2 m.

In keeping with these objects and with others which will become apparent hereinafter, one feature of the present invention resides, briefly stated, in a supporting plate in which a framework is provided which is filled with a mineral casting in a such a way that the framework and the metal casting form a solid plate.

In accordance with the new method of producing a supporting plate, a framework is placed on a mould underlay and used as a casting mould, and the framework is filled with a mineral casting.

When the supporting plate is designed and the method is performed in accordance with the present invention it eliminates the disadvantages of the prior art and achieves the above specified objects.

In accordance with still a further feature of the present invention, struts are fitted within the framework in such a way that their surfaces terminate flush with the upper side of the plate.

Also, means for receiving fastening elements for the fabrication, assembly and/or test equipment to be set up as well as means for anchorage in the mineral casting are provided on the framework and/or on the struts. It is particularly advantageous that the framework and the struts have a profile cross-section with undercut grooves. The profile cross-section has, on the one hand, the effect that the mineral casting anchors in the undercut grooves and, on the other hand, the effect that the undercut grooves of the profile can receive fastening elements which can assume a variable position along the undercut grooves.

In accordance with still a further feature of the present invention, for the purpose of anchoring the mineral casting, additional anchoring elements, similar to the fastening elements, can be inserted into the undercut grooves.

The fastening elements can be designed as hammer head screws and/or hammer nuts in connection with standard screws.

The undercut grooves can be made as T-grooves. The plate can have one or more openings. The struts at the same time can form the boundary for one or more opening. The plate in accordance with the present invention can form the top of the table, the feet of the table being attached to the framework or the fastening insert in the mineral casting.

In the method in accordance with the present invention, a mould underlay having a pattern of openings intended for all frame configurations can be used, and an intermediate underlay with the desired pattern of openings can be placed on the mould underlay.

The desired surface quality of the plate is obtained in accordance with the invention method as an image of the mould underlay or the intermediate underlay.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

An exemplary embodiment of the invention is

DESCRIPTION OF THE PREFERRED EMBODIMENTS

Figure 2:
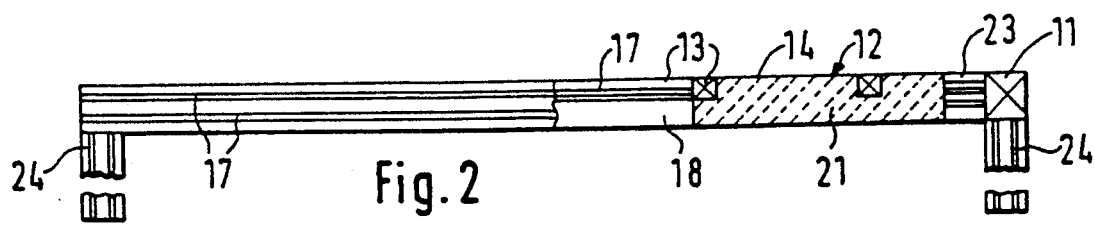
FIG. 2 shows a side view with a part-sectional representation of the supporting plate according to the invention in an embodiment as a table.

The basic body of the supporting plate comprises a framework 11, which is joined together by means of angles 23 fitted in the corners and a plurality of struts 13 within the framework 11. The inner space of the framework 11 is filled by a mineral casting 21, so that the framework 11, the struts 13 and the mineral casting 21 form a solid plate 12. What is meant by the term mineral casting, also referred to as polymer concrete or casting-resin concrete, is a resin-bonded material which is highly enriched with fine-grained and/or coarse-grained, usually quartzitic fillers. As binders, resins are used (epoxy, polyester, vinylester, polymethylmethacrylate (PMMA) etc.) which cure both by polyaddition and by polymerisation. Depending on the viscosity, filler, type of binder and component geometry/dimension, the binder content is between 7 and 20%. Such materials are known in principle.

Figure 1:
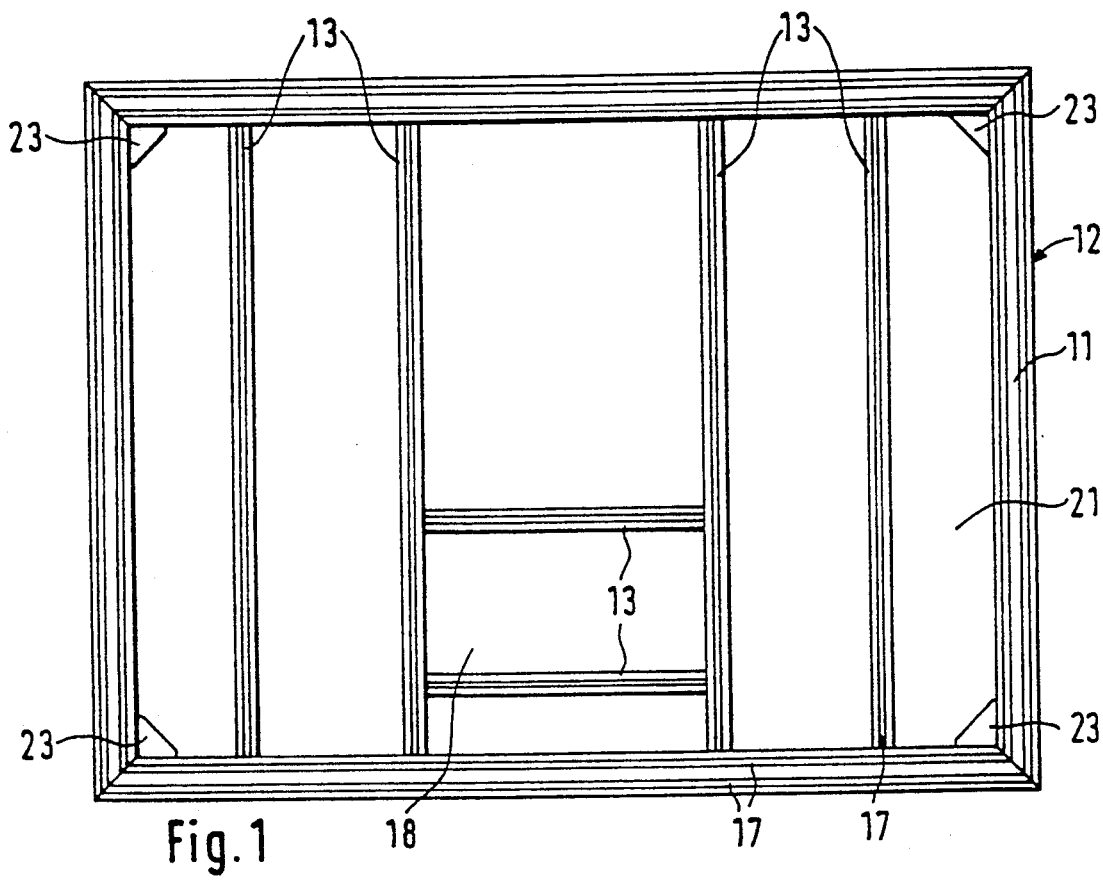
FIG. 1 shows a plan view of the supporting plate according to the invention.
Figure 3:
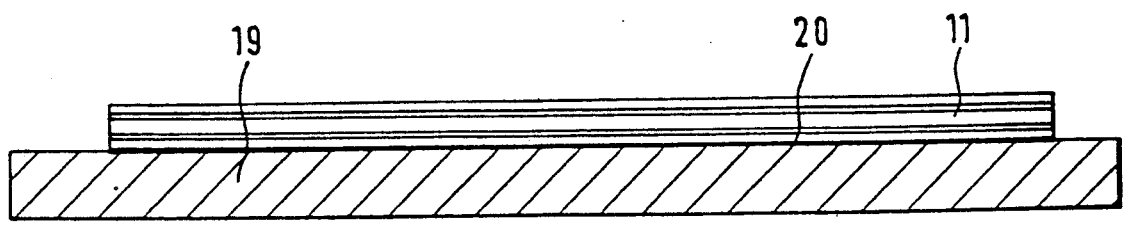
FIG. 3 shows an embodiment of the profile cross-section of the framework 11 and of the struts 13.

Depending on the intended use, the supporting plate requires openings 18. In the present exemplary embodiment, one opening 18 is provided which is bounded by four struts 13 (FIGS. 1 and 2). The struts 13 are arranged within the framework 11 in such a way that their surface terminates flush with the upper side 14 of the plate 12.

Figure 4:
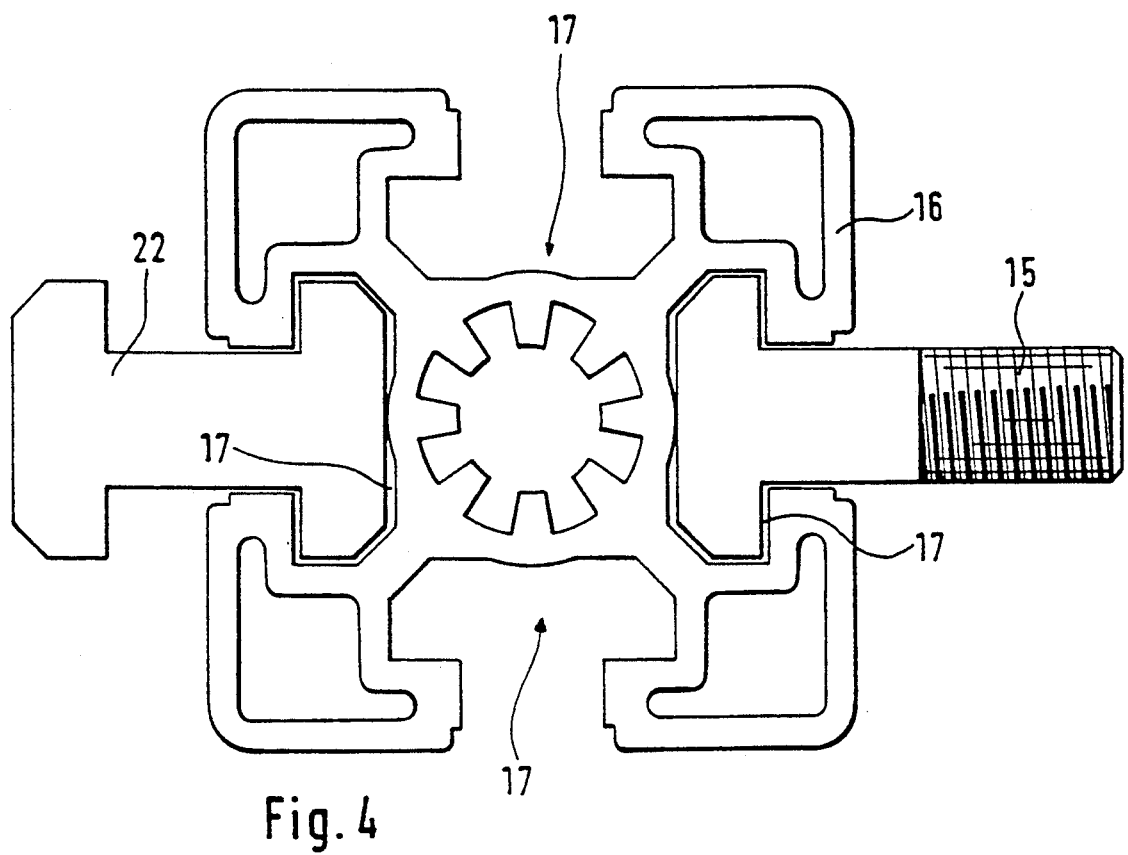
FIG. 4 shows an arrangement for carrying out the process according to the invention and FIG. 5 shows a side view in sectional representation of the supporting plate according to the invention in a further embodiment as a table.

The framework 11 and the struts 13 are made from profiled material. The profiled material of the struts 13 has a profile cross-section 16 according to FIG. 4, with undercut grooves 17 made as T-grooves and extending along each side. For reasons of stability, in the present exemplary embodiment the profile cross-section of the framework 11 is designed to be thicker than the profile cross-section 16 of the struts 13 and has on each side two extending undercut grooves 17, which have the same shape as in the profile cross-section 16.

The mineral casting 21 can flow into the undercut grooves 17 and thus finds a firm anchorage. To assist the anchorage, anchoring elements 22, similar to the fastening elements 15, may be introduced into the undercut grooves 17, engaging deeper into the mineral casting. The undercut grooves 17 extending on the upper side 14 of the plate 12, which are likewise made as T-grooves, serve for receiving the fastening elements 15. In the present case, hammer head screws or standard screws and hammer nuts, available as standard items, are suitable as the fastening elements 15. These fastening elements can be brought into any desired position along the T-grooves 17. Consequently, one and the same supporting plate can be used for various set-ups of fabrication, assembly and test equipment. Apart from the profile cross-section 16 given in FIG. 4, the use of other profiled materials of which the profile cross-sections have undercut grooves 17 is possible.

Figure 5:
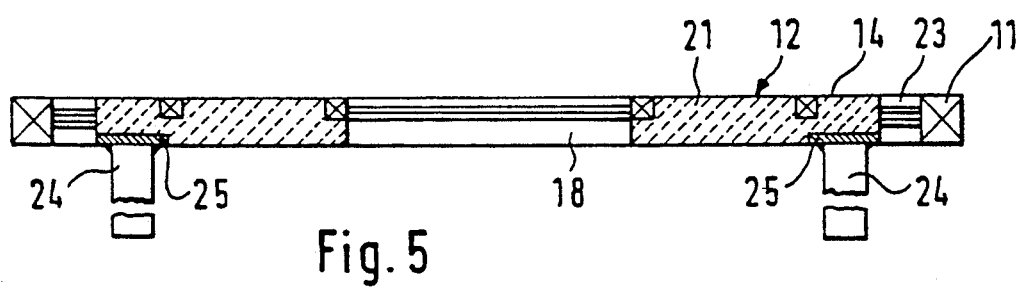

One embodiment of the supporting plate consists in that the plate 12 forms the top of a table. Feet 24 of the table are attached to the framework 11 by means of usual screw joints (FIG. 2). According FIG. 5, they are attached by fastenings 25, to which the feet 24 are fastened, being cast into the mineral casting 21. In the present exemplary embodiment, the fastenings 25 are in each case formed by plates which are welded to the feet 24. However, other usual screw joints are also conceivable.

To produce the supporting plate, the framework 11 is placed on a mould underlay 19 with a release agent in between, so that the framework 11 forms the formwork of the casting mould. The fixing of the framework 11 on the mould underlay 19 is performed with the aid of stays (not shown in the drawing), adjustably fitted above the mould underlay 19. This ensures that any frame formats up to the designated maximum size can be fixed on the mould underlay 19 with any network of struts, without spoiling the decorative mineral casting surface by imprints resulting from covered openings, which would be necessary for different configurations.

A second exemplary embodiment for producing the supporting plate consists in that a mould underlay 19 having a pattern of openings intended for all configurations is used, onto which underlay an intermediate underlay 20 provided with the respective pattern of openings of the desired configuration is placed. The use of the intermediate underlay 20 makes it possible to fasten the framework 11 and the struts 13 by means of simple elements, such as for example hammer head screws, which can be inserted through from the underside of the mould underlay 19 into the T-grooves of the profile cross-section 16. This embodiment has the particular advantage that the actual mould underlay 19 does not come into contact with the mineral casting 21 and consequently does not undergo any wear. On the other hand, the relatively flimsy intermediate underlay 20 can be exchanged at any time in the event of wear or damage.

In principle, the use of an intermediate underlay 20 is also advantageous for the first variant of the method of producing the supporting plate.

Once the framework 11 has been fixed onto the mould underlay 19 or onto the intermediate underlay 20, as described in the two exemplary embodiments for the production of the supporting plate, the mineral casting is introduced into the casting mould formed by the framework 11 and the struts 13. To achieve a high packing density and the associated improvements in properties, the entire arrangement is shaken during and after the filling operation for the purpose of compaction. The curing of the mineral casting composition takes place within 12 hours. The final hardness is achieved after three days. No additional ageing is necessary.

As already described, desired openings 18 in this supporting plate are bounded by appropriately arranged struts 13. This region is left clear during pouring with mineral casting.

Another possibility of introducing openings 18 can be realised by inserting cores within the framework 11.

It will be understood that each of the elements described above, or two or more together, may also find a useful application in other types of constructions and methods differing from the types described above.

While the invention has been illustrated and described as embodied in a supporting plate and a method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A supporting plate for setting up fabrication, assembly and/or test equipment, comprising a framework having an upper side; a mineral casting; and a plurality of struts having upper surfaces which terminate flush with said upper side of said framework, said framework and said struts having a profile cross-section with undercut grooves which form both means for receiving fastening elements for the fabrication, assembly and/or test equipment and means for anchoring said mineral casting so that in order to provide anchoring said mineral casting can flow into said undercut grooves, so that said framework and said mineral casting together form a solid plate.

2. The supporting plate as defined in claim 1; and further comprising additional anchoring elements which are similar to said fastening elements and also inserted in said undercut grooves for anchoring.

3. The supporting plate as defined in claim 1, wherein said means for receiving said fastening elements are formed so as to receive fastening elements formed as hammer head screws.

4. The supporting plate as defined in claim 1, wherein said means for receiving said fastening elements are formed so as to receive fastening elements formed as hammer nuts in connection with standard screws.

5. The supporting plate as defined in claim 1, wherein said undercut grooves are formed as T-grooves.

6. The supporting plate as defined in claim 1, wherein said framework are provided with at least one opening.

7. The supporting plate as defined in claim 1, wherein said struts form a boundary for at least one opening.

8. The supporting plate as defined in claim 1, wherein said solid plate forms a top of a table; and further comprising means forming feet attached to said solid plate.

9. The supporting plate as defined in claim 8, wherein said feet are attached to said framework.

10. The supporting plate as defined in claim 8; and further comprising fastenings arranged in said mineral casting, said feet being attached to said fastenings.

11. A method of producing a supporting plate for setting up fabrication, assembly and/or test equipment, comprising the steps of casting a framework with a mineral casting; utilizing the framework having a plurality of profile elements; providing the framework with a plurality of profile struts forming a plurality of openings; providing a mold underlay having a pattern of openings for all frame configurations; placing an intermediate underlay with a desired pattern of openings on the mold underlay; and placing the framework on the intermediate underlay.

12. The method as defined in claim 11; and further comprising the step of forming a desired surface quality of the plate as an image of the mould underlay.

13. The method as defined in claim 11; and further comprising the step of forming a desired surface quality of the plate as an image of the intermediate underlay.

* * * * *